Figure 1:
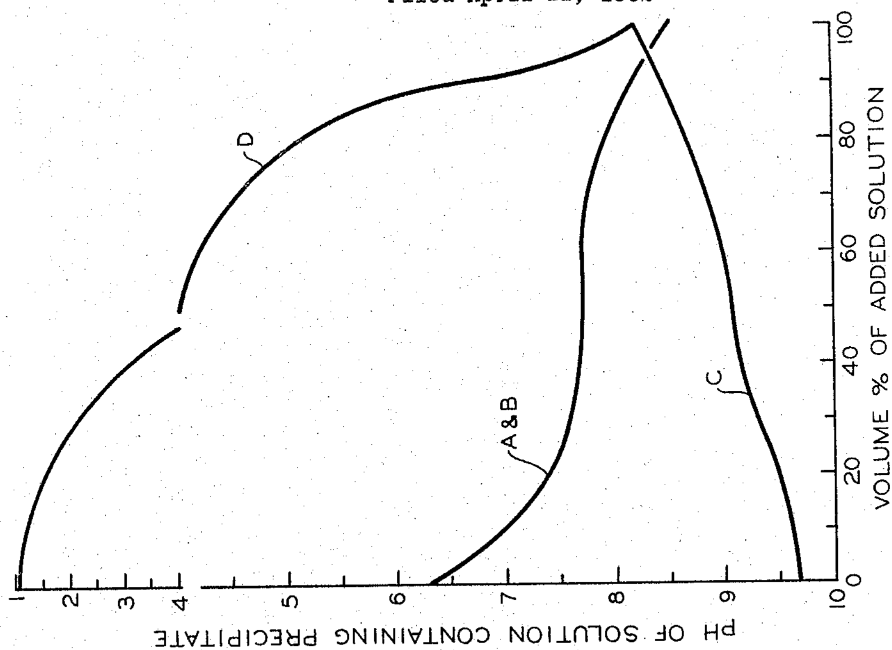

PROCESS FOR PREPARING A CALCIUM-NICKEL PHOSPHATE CATALYST

Filed April 11, 1962

INVENTOR.
L. J. BAGNETTO, JR.

BY Young and Quigg

ATTORNEYS

United States Patent Office 3,298,966

Patented Jan. 17, 1967

1

3,298,966
PROCESS FOR PREPARING A CALCIUM-NICKEL PHOSPHATE CATALYST

Lucien J. Bagnetto, Jr., Bartlesville, Okla., assignor to Phillips Petroleum Company, a corporation of Delaware Filed Apr. 11, 1962, Ser. No. 186,749
3 Claims. (Cl. 252—437)

This invention relates to an improved calcium-nickel phosphate catalyst useful for the dehydrogenation of olefins. In one aspect, the invention relates to an improved method for preparing a calcium-nickel phosphate catalyst having high activity and selectivity for the dehydrogenation of olefins.

In another aspect, the invention relates to a method for the dehydrogenation of olefins with a calcium-nickel phosphate catalyst having high activity and a high selectivity for a given conversion.

It is known that monoolefins may be dehydrogenated to form diolefins and that this dehydrogenation may be catalyzed by a calcium-nickel phosphate composition. This catalyst consists essentially of a normal metal phosphate material composed of calcium and nickel chemically combined in relative proportions of between 6 and 12 atoms of calcium per atom of nickel with the phosphate radicals. A number of methods have been proposed for the preparation of said calcium-nickel phosphate catalysts. In one method a solution of calcium and nickel salts containing 6 to 12, and preferably from 7.5 to 12, atoms of calcium per atom of nickel are added to a solution of a soluble phosphate while maintaining the resultant mixture in a neutral or preferably alkaline condition. Another proposed method for the preparation of said catalyst is the addition of an aqueous solution of phosphoric acid and the calcium-nickel salts to an aqueous solution of an alkali, such as ammonium. After the formation of the precipitate under neutral or alkaline conditions, it is washed with water and dried. Prior to use as a dehydrogenation catalyst, it may advantageously be admixed in powder or granular form with a lubricant, such as graphite or a vegetable or mineral oil, and be pressed into tablets of a size convenient for use. Thereafter, the lubricant is removed by oxidation.

I have now discovered that the method of preparation of said calcium-nickel phosphate catalyst is an important factor in the determination of its ultimate activity, selectivity and conversion efficacy.

It is an object of the invention to provide a calcium-nickel phosphate catalyst having a high activity and high selectivity for the dehydrogenation of olefins.

It is another object of the invention to provide an improved method for the preparation of a calcium-nickel phosphate catalyst.

It is another object of the invention to provide an improved method for the dehydrogenation of olefins with a calcium-nickel phosphate catalyst.

These and other objects of the invention will be apparent to those skilled in the art upon consideration of the following detailed description of the invention.

These and other objects of the invention are broadly accomplished by a novel composition of matter useful for the dehydrogenation of olefins comprising a calcium-nickel phosphate complex prepared by adding a solution of a soluble ortho-phosphate to a solution of soluble calcium-nickel salts so as to precipitate a metal phosphate material comprising phosphate radicals chemically combined with calcium and nickel from said mixture.

In one aspect of the invention, chromium oxide is added to said precipitated metal phosphate material.

In another aspect of the invention, olefins are dehydrogenated by passing the olefin together with steam at a dehydrogenation temperature through a bed of a catalyst mixture comprising a metal phosphate material comprising phosphate radicals chemically combined with calcium and nickel, said metal phosphate material being prepared as hereinbefore described.

2

The catalyst of this invention is useful for the thermal dehydrogenation of an olefin having at least 4 carbon atoms in a carbon chain containing the olefinic linkage. Generally, steam is present as a diluent in the pyrolysis mixture. The calcium-nickel phosphate catalyst has little, if any, action in catalyzing the thermal dehydrogenation of olefins such as ethylene, propylene or isobutylene which have fewer than 4 carbon atoms in the chain containing the olefinic linkage. When the catalyst is employed in dehydrogenating an olefin having only 4 carbon atoms in the unsaturated carbon chain, the principal organic product is a conjugated diolefin such as butadiene-1,3 or isoprene, etc. An olefin having more than 4 carbon atoms in the chain containing the olefinic linkage may be cyclized during treatment with the catalyst. For instance, the dehydrogenation of hexene-1 may be carried out to produce benzene. Suitable olefins which may be dehydrogenated include the monoolefins having 4 to 10 carbon atoms per molecule, such as butene, pentene, hexene, heptene, octene, nonene, decene and the like. Preferred olefins include butene, pentene and hexene.

During use in the dehydrogenation reaction, the catalyst gradually accumulates a small amount of carbonaceous or tarry organic material and loses its activity. When necessary, it may be reactivated by oxidation of the impurities accumulated thereon. This may be accomplished by passing an oxygen-containing gas such as air or vapor mixture of air and steam over the catalyst at temperatures between 950° F. and 1400° F., usually between 1000° and 1300° F.

I have now found that by adding the solution of the soluble phosphate to the solution of the calcium and nickel salt while mixing, that a catalyst having improved selectivity and activity for a given conversion is obtained as compared to the prior art method of adding a solution of the calcium and nickel salts to the solution of the soluble phosphate. Preferably, the catalyst of the present invention is produced by the addition of an aqueous solution of ammonium phosphate to an aqueous solution of soluble calcium and nickel salt such as chlorides, nitrates, acetates, etc. to precipitate the mixed calcium-nickel phosphate with a calcium/nickel atomic ratio of between 6 and 12, preferably between 7.5 and 12. Examples of other soluble phosphates that may be employed as starting materials are dissodium phosphate, trisodium phosphate, dipotassium phosphate, diammonium phosphate and the like. The aqueous ammonium phosphate solution should contain at least sufficient ammonium ion to have the composition of diammonium phosphate and preferably the composition is that of triammonium phosphate. An excess of ammonium ion such as 5 to 20% over that stoichiometrically equivalent to triammonium phosphate is quite satisfactory.

According to the prior art, it was important that the precipitation be carried out to completion under neutral or alkaline conditions since the precipitate which was formed when the reaction mixture becomes acidic, that is, a pH value below 7, possesses inferior properties as a catalyst. Usually the precipitation was carried out under moderately alkaline conditions so that sufficient phosphate ion was added to precipitate substantially all of the calcium and nickel ions with the pH of the solution upon completion of mixing being at least 7. It has now been discovered that a catalyst having improved selectivity can be prepared by the method of this invention even though the initial pH is acidic. The pH of the resultant solution is at least 7, preferably in the range of 7 to 9, more preferably in the range of 8 through 8.5.

The soluble phosphate solution is preferably added with good mixing to the calcium-nickel salt solution over a period of time in the range of about 15 minutes to 24 or more hours, and the addition can be effected either batchwise or in a series of stages. Multi-batches can be made in staggered cycles to operate in effect as a continuous process or multi-addition stages, preferably at least 3 operated in series so as to effect continuous operation.

The catalyst products have proven to be particularly active when prepared by precipitation from a mixture containing an ionizable basic nitrogen compound such as ammonium, a water-soluble ammonium salt, or water-soluble amine or amine salts such as diethylamine, triethylamine, diethanolamine and the like but the presence of such basic nitrogen compound is not required.

The precipitate so suspended in the aqueous medium can be recovered by any of several known methods, for example a combination of decantation and/or filtration with washing, to remove ions other than calcium-nickel and phosphate. The removal of such nickel-containing impurities may have a catalytic action on the thermal decomposition of hydrocarbons other than that of the desired catalyst; and chlorides, if retained in the catalyst, tend to deactivate the latter. After being washed with the water or other agent, the product is preferably dried, usually at a temperature between 140 and 300° F. The dried product is a hard gel, usually of yellowish color. The gel may then be crushed or otherwise reduced to granules or small lumps and be used directly as a dehydrogenation catalyst, or it may be preferably pulverized, such as to a particle size capable of passing a 28-mesh screen, and the powdered product treated with a lubricant and pressed into a form of a pill or tablet or granule of size suitable for use as a catalyst, such as in the form of tablets of from 1/16 inch to 1/2 inch diameter.

Preferably, the calcium-nickel phosphate precipitate is admixed with chromium oxide. One advantage of this procedure is the lowering of the minimum temperature necessary for the catalytic dehydrogenation of the reactive olefin, in some instances by as much as 200° F. below the temperature required when using the same phosphate alone as a catalyst. In general, the mixture of chromium oxide and calcium-nickel phosphate are employed as a dehydrogenation catalyst at temperatures below those at which as much as 5% of the hydrocarbon material undergoes carbonization and usually at temperatures exceeding by less than 300° F. the minimum temperature at which the catalytic dehydrogenation occurs at an appreciable rate.

A chromium oxide, usually $Cr_2O_3$, may be added to the wet precipitate such as before or after washing the precipitated phosphate material with water. However, in practice, it is preferred to separate, wash, dry and when necessary pulverize the calcium-nickel phosphate prior to admixing the chromium oxide therewith. This phosphate is usually dried at a temperature between 140 and 300° F. Admixing the chromium oxide with the preformed calcium-nickel phosphate may be accomplished by adding chromium oxide powder to the powdered or granular phosphate and agitating the mixture or by adding the chromium salt to the phosphate and subsequently hydrolyzing or decomposing the salt to form the chromium oxide in situ.

In most instances, only a small proportion, such as from 0.05 to 5% by weight of chromium oxide is present in admixture with the phosphate in order to obtain the benefits of said addition. The chromium oxide is employable in larger proportions if desired, such as 30% by weight. Preferably the catalytic mixture contains not more than 30% by weight of chromium oxide.

In dehydrogenating an olefin in accordance with the invention, a reaction chamber is charged with the granular catalyst and the lubricant is removed by passing air or preferably a mixture of about equal volumes of air and steam through the catalyst bed at a high temperature such as 850° F. to 1400° F. After freeing the catalyst of lubricant, the catalyst bed is swept free of air and steam and is heated to the desired reaction temperature preferably by passing superheated steam through the same. A mixture of steam and the olefin is passed through the catalyst bed usually at a dehydrogenation temperature in the range of 950° to 1400° F., preferably 1000 to 1300° F., although temperatures lower or higher than just mentioned may be in some instances employed. Steam diluent in amounts of 10 to 20 volumes per each volume of olefin are preferably used although more or less can be employed. The dehydrogenation is ordinarily carried out at about atmospheric pressure at hourly hydrocarbon space velocities of 100 to 700 although the catalyst is effective at pressures and space rates above and below those given. The usual procedure is to pass the olefin-containing gas in admixture with steam which has been superheated to about 1100° F. or above, that is at a temperature sufficient so that the resultant mixture is at the desired reaction temperature, and to pass the vapor mixture through the bed of catalyst. However, the heat may be supplied in other ways such as by forming the steam and hydrocarbon mixture below the temperature required and passing it through a preheater, or by externally heating the catalyst chamber itself. Vapors flowing from the catalyst chamber ordinarily pass through heat exchangers and other cooling devices to condense the water and hydrocarbons with the water being separated and purified in known ways such as by fractional distillation or selective extraction operations, etc.

During use of the dehydrogenation reaction, the catalytic mixture gradually accumulates a small amount of carbon or non-volatile organic material and becomes less active. Accordingly, flow of the hydrocarbon starting material is periodically interrupted and air admixtures with about an equal volume of steam is blown through the catalyst bed to oxidize and remove the carbonaceous organic material and thus react with the catalyst.

The following examples best illustrate the improved efficacy of the novel method of catalyst preparation of this invention for the dehydrogenation of olefins, as compared to similar calcium-nickel phosphate catalysts prepared by different methods.

EXAMPLE I

Five catalysts having the general designation as calcium-nickel phosphate materials were prepared in different manners and subsequently employed for the dehydrogenation of 2-butene. Catalysts A and B were employed by the method of the invention with catalyst A being prepared as 8 to 12 mesh granular and catalyst B being formed into tablets using a graphite lubricant. Catalyst C was prepared by the addition of the calcium-nickel salt solution to the ammonium phosphate solution, a prior art method. Catalyst D was prepared by another prior art method by the addition of ammonium hydroxide to an aqueous mixture of calcium and nickel chlorides and ortho-phosphoric acid. Catalyst E was a commercially available catalyst believed prepared by a method similar to that of catalyst C.

*Catalyst A.*—Catalyst A was prepared from a solution of 246 grams of $CaCl_2$ and 61.3 grams of

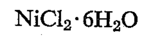

$NiCl_2 \cdot 6H_2O$ in 9 liters of distilled water and a solution of 196 grams of 85 percent $H_3PO_4$ in 23 liters of distilled water to which was added 400 cc. of 29 weight percent aqueous ammonia in 2 liters of additional water. The pH of the ammonium phosphate solution was 9.5 and of the calcium-nickel chloride solution was 6.3. The ammonium phosphate solution was added over a period of 110 minutes (about 250 cc./minute) with stirring to the calcium-nickel chloride solution. The gel started forming immediately after the start of addition of the ammonium phosphate solution. A record of the pH during the addition is shown in FIGURE 1.

The gel was washed once by allowing it to settle, the supernatant liquid decanted, and resuspended with added water. The suspension was filtered and resuspended in fresh water until free of chloride ion as indicated by testing the filtrate with silver nitrate. The gel was then dried at about 150° F. for 24 hours, producing a gel cake.

A portion of the gel cake was crushed with a mortar and pestle to pass an 8-mesh screen and dried in air at 265° F. for 24 hours. After cooling, 50 grams of gel and 2.0 grams of $Cr_2O_3$ were mixed, ground with a mortar and pestle, sieved through a 60-mesh screen, and dried in air at 266° F. The powder, after cooling, was pelleted without a binder into one-fourth inch slugs, and these were crushed and separated by screening to 8–12 mesh granules.

*Catalyst B.*—A second portion of the gel cake described under catalyst A was dried in air at about 290° F. for about 24 hours. A 91.53-gram portion of the dried gel cake and 1.83 grams of $Cr_2O_3$ were ground and mixed by mortar and pestle followed by sieving and shaking of the mixed powders. This material was formed into one-eighth-inch by one-eighth-inch tablets using a graphite lubricant by first forming slugs, grinding, sieving a 40–70 mesh fraction and tabletting.

*Catalyst C.*—Solutions of calcium-nickel chloride and ammonium phosphate were made up as described under catalyst A. The aqueous calcium chloride-nickel chloride solution was continuously added to the ammonium phosphate solution with stirring over a period of 2 hours. The pH of the mixture during addition is shown in FIGURE 1. The precipitated gel was washed and dried as described under catalyst A.

A 56.7 gram portion of the crushed and dried gel cake was mixed with 1.1 grams of $Cr_2O_3$, and 8–12 mesh granules and made from this mixture, all as described under catalyst A.

*Catalyst D.*—The gel for this catalyst was made from the same amounts of calcium and nickel chlorides, ammonia, 85 percent orthophosphoric acid and water. The calcium and nickel chlorides and 85 percent phosphoric acid were dissolved in water to produce about 24 liters of solution and the ammonium hydroxide was added to water to form a second solution of about 8 liters. The ammonium hydroxide solution was continuously added to the calcium and nickel salt solution with stirring over a period of two hours. A record of the pH of the solution containing the precipitate is shown on FIGURE 1.

The gel was washed and dried as described under catalyst A. A 54.0-gram portion of the dried gel cake was mixed with 1.1 grams of $Cr_2O_3$, and 8–12 mesh granules were produced, also as described under catalyst A.

*Catalyst E.*—Although the method of producing this catalyst is not known, the catalyst contained approximately 89 percent (wt.) $Ca_3(PO_4)_2$, 10 perecnt $Ni_3(PO_4)_2$ and 1 percent $Cr_2O_3$. (Dow B, Dow Chemical Co., Midland, Michigan.)

EXAMPLE II

The catalysts of Example I were tested for butene dehydrogenation using 2-butene as a feed at 150 volumes (STP) an hour based on the catalyst volume, steam/hydrocarbon mole ratio of 20/1, and atmospheric pressure. The dehydrogenation cycle was 15 minutes, followed by an air regeneration cycle of 12 minutes.

For convenience, the catalyst compositions and forms are shown in Table I.

TABLE I

| | Percent $Ca_3(PO_4)_2$ | Percent $Ni_3(PO_4)_2$ | Percent $Cr_2O_3$ | Form |
|---|---|---|---|---|
| A | 86 | 10 | 4 | 8–12 Mesh granules. |
| B | 87 | 11 | 2 | ⅛" Tablets. |
| C | 87 | 11 | 2 | 8–12 Mesh granules. |
| D | 87 | 11 | 2 | 8–12 Mesh granules. |
| E | 89 | 10 | 1 | ⅛" Tablets. |

Dehydrogenation test data are shown in the tables which follow:

TABLE II.—CATALYST A

| Run No. | 1 | 2 | 3 | 4 |
|---|---|---|---|---|
| Outlet temperature, ° F. | 1,100 | 1,115 | 1,145 | 1,170 |
| Catalyst age, hours | 222 | 481 | 681 | 493 |
| Conversion[1], percent | 49.1 | 43.5 | 46.2 | 56.0 |
| Yield[2], percent | 45.4 | 40.0 | 42.8 | 51.4 |
| Selectivity[3], percent | 92.5 | 92.0 | 92.7 | 91.9 |
| Coke, wt. percent of feed | | 0.14 | 0.14 | 0.14 |

TABLE III.—CATALYST B

| Run Number | 5 | 6 |
|---|---|---|
| Outlet temperature, ° F. | 1,105 | 1,100 |
| Catalyst age, hours | 73 | 264 |
| Conversion[1], percent | 43.3 | 36 |
| Yield[2], percent | 39.9 | 33.4 |
| Selectivity[3], percent | 92.3 | 92.7 |
| Coke, wt. percent of feed | 0.19 | 0.27 |

TABLE IV.—CATALYST C

| Run Number | 7 | 8 |
|---|---|---|
| Outlet temperature, ° F. | 1,100 | 1,110 |
| Catalyst age, hours | 529 | 635 |
| Conversion[1], percent | 44.1 | 46.6 |
| Yield[2], percent | 40.3 | 42.6 |
| Selectivity[3], percent | 91.4 | 91.3 |
| Coke, wt. percent of feed | 0.22 | 0.30 |

TABLE V.—CATALYST E

| Run Number | 9 | 10 |
|---|---|---|
| Outlet Temperature, ° F. | 1,230 | 1,200 |
| Catalyst age, hours | 148 | 224 |
| Conversion[1], percent | 52.5 | 44.4 |
| Yield[2], percent | 46.5 | 40.2 |
| Selectivity[3], percent | 88.6 | 90.7 |
| Coke, wt. percent of feed | 0.12 | 0.10 |

[1] Weight percent of butene-2 destroyed.
[2] Amount of 1,3-butadiene produced per 100 moles of butene-2 fed through bed.
[3] Weight percent of 1,3-butadiene produced per 100 moles of butene-2 destroyed.

Catalyst D was of such low activity (12.5 percent conversion at 1225° F. at the age of 26 hours) that it cannot be considered to be of any real value compared to the other catalysts.

Figure 2:
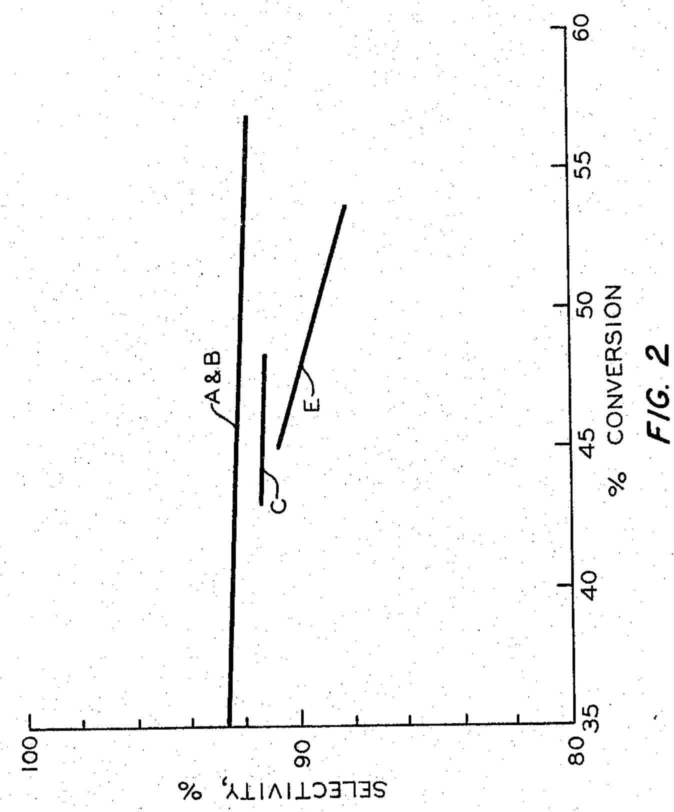

Comparison of the conversion-selectivity relationships plotted in FIGURE 2 for catalysts A, B, C and E shows that A and B (catalysts of the present invention in granules and in tablets) show consistently better selectivity over wide conversion ranges than do the prior art catalysts C and E. This figure also shows catalysts A and B to be equivalent, and the differences between granular and pelleted catalysts and small differences in chromium oxide content are of no consequence.

A comparision of the pH history of catalysts A and B with those of catalysts C and D (FIGURE 1) shows that each of the catalysts was formed at essentially the same final pH (8.2 to 8.5). It is thus evident that the near inactivity of catalyst D is due to the different method and order of mixing of ingredients.

It is evident from a comparison of the pH changes, catalyst activities and selectivities that the high activity and increased selectivity of catalysts A and B are a result of the addition of the ammonium phosphate solution to the solution of nickel and calcium salts.

The improvement in selectivity obtained by this catalyst is of considerable importance in large scale commercial operation. Operations producing 100 or more tons of butadiene daily would show quite appreciable decreases in feed stock requirements using this catalyst in place of prior art catalysts.

While certain examples, structures, compositions and process steps have been described for purposes of illustration, the invention is not limited to these. Variations and modification within the scope of the disclosure and the claims can readily be effected by those skilled in the art.

I claim:

1. A process for preparing a calcium-nickel-phosphate catalyst employable for the dehydrogenation of olefins which comprises first introducing an aqueous solution of soluble calcium and nickel salts having an initial acidic pH into a catalyst preparation zone and thereafter introducing, with mixing, into said solution of soluble calcium and nickel salts an aqueous solution of ammonium phosphate and precipitating a metal-phosphate material at a final pH in the range of 7 to 9, said calcium and nickel being chemically combined with phosphate radicals in the relative proportions of between 6 and 12 atoms of calcium per atom of nickel, and treating the precipitated metal-phosphate material with chromium oxide so as to add chromium oxide in an amount less than the weight of said precipitated metal-phosphate material.

2. The process of claim 1 wherein said mixing takes place over a period of time in the range of 15 minutes to 24 hours.

3. The process of claim 1 wherein said solution of ammonium phosphate contains at least enough ammonium ions to have a composition of diammonium phosphate.

References Cited by the Examiner

UNITED STATES PATENTS

| | | | |
|---|---|---|---|
| 2,442,320 | 5/1948 | Britton et al. | 260—680 |
| 2,456,368 | 12/1948 | Britton et al. | 260—680 |
| 2,542,813 | 2/1951 | Heath | 260—680 |

PAUL M. COUGHLAN, Jr., *Primary Examiner.*

ALPHONSO D. SULLIVAN, *Examiner.*